R. E. HELLMUND.
SYSTEM OF CONTROL.
APPLICATION FILED NOV. 3, 1919.
1,360,745.
Patented Nov. 30, 1920.
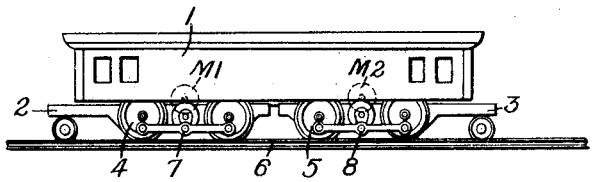
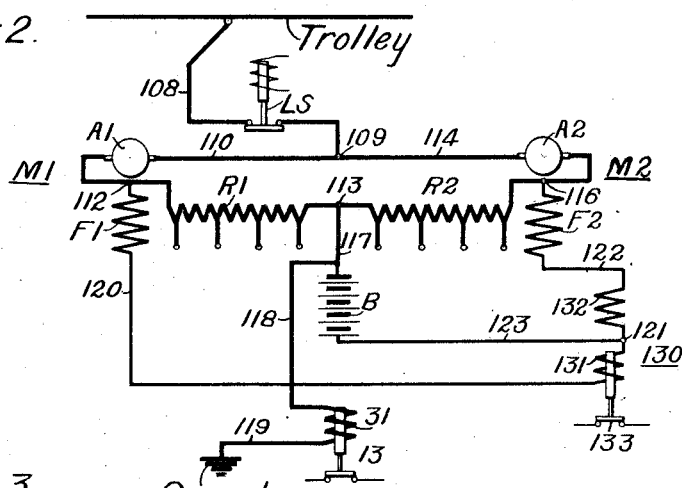
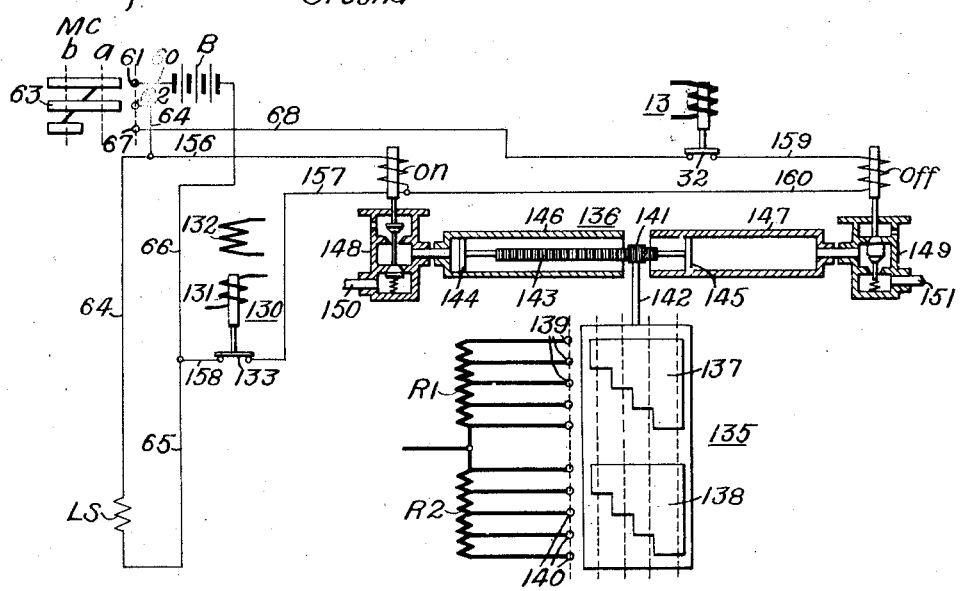
WITNESSES:
J. A. Helsel
W. R. Coley
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,360,745.   Specification of Letters Patent.   Patented Nov. 30, 1920.

Original application filed September 27, 1916, Serial No. 122,373. Divided and this application filed November 3, 1919. Serial No. 335,476.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification, this application being a division of my copending application Serial No. 122,373, filed September 27, 1916, patented April 13, 1920, No. 1,336,562.

My invention relates to electric vehicles and to systems of control therefor and especially to vehicles embodying dynamo-electric machines that are adapted for regenerative operation.

Whenever an electric vehicle is retarded by means of the electro-dynamic or regenerative operation of the machines, there is a certain liability that difficulty will be experienced by reason of skidding of one or more of the sets of wheels and, meanwhile, a relatively low current and torque are produced by the machines associated with skidding wheels.

Assuming, for instance, that a plurality of momentum-driven machines are regenerating in parallel relation and that the control thereof is automatic, that is, dependent upon the well-known action of a limit switch, it may happen that the wheels corresponding to one machine will skid, and the control system will be automatically actuated to close further switches, or the like, by reason of the relatively low-current conditions prevailing in the skidding-machine circuit, thus overloading the other machines which, in turn, may cause the wheels associated with them to skid and, moreover, is, of course, undesirable from the standpoint of heating. Similar objectionable conditions may occur with manually-operated control systems if one of the machines skids and the operator, noticing that the braking effect has been reduced, actuates his controller to a subsequent position, as will be understood.

One object of my invention, therefore, is to provide, in connection with a system of the above-indicated character, means which shall be relatively simple and inexpensive in construction and effective and reliable in operation for automatically performing predetermined functions to reverse the normal operation of the system under wheel-skidding conditions, until a normal state of affairs again obtains.

According to my present invention, I provide, preferably, an automatic auxiliary governing system for a plurality of momentum-driven dynamo-electric machines, which system is controlled, in the familiar manner, by a limit switch and relay means that are electrically related to the respective armatures in such manner that, when the loads of all the machines are equal, the relay means are inoperative with respect to modifying the auxiliary control system operation, but, whenever skidding conditions occur in any machine, so that the current therethrough is materially reduced by reason of the relatively great change of speed of the skidding-machine armature, then the relay means in question acts to reverse the normal automatic operation of the control system, or, in other words, renders the limit switch temporarily inoperative until normal speed conditions of all the machines again obtain.

In the accompanying drawing, Figure 1 is a diagrammatic view of an electric vehicle that is adapted to utilize the principles of my present invention; Fig. 2 is a diagrammatic view of the main circuits of a system of control embodying my invention; and Fig. 3 is a diagrammatic view of an auxiliary governing system for the main system of Fig. 2.

Referring to Fig. 1, the structure shown comprises a locomotive cab 1 which is suitably supported upon a plurality of articulated trucks 2 and 3 of appropriate design and which respectively embody a plurality of driving wheels 4 and 5 that are adapted to run upon rails 6 in accordance with usual practice. A plurality of dynamo-electric machines $M^1$ and $M^2$, which are adapted to regeneratively brake the vehicle, as well as electrically propel it, are provided and may be associated with the wheels of the various trucks in any suitable manner, as by driving mechanisms 7 and 8 of a familiar type.

It will be understood that, for the sake of simplicity and clearness, various switches which would actually be used in a commercial regenerative system for interconnecting the main machines, etc., are not shown in the present instance, as such illustration is not necessary to a thorough comprehension of my invention.

In some systems that inherently tend to maintain a substantially constant regenerated current, it may be preferable to employ relays that are energized in accordance with the respective field-winding currents or voltages rather than by the armature currents, as described in my above-identified co-pending application, the reason being that the main field-winding current and voltage are generally increased as the speeds of the momentum-driven machines decrease and thus the field-winding voltage or current alone is a substantially correct indication or measure of the machine speed. By utilizing the relay devices that are energized in accordance with field-winding conditions, in some cases more reliable operation of the devices will be obtained and, moreover, they need not be designed to act as sensitively as the relay devices that are energized by armature currents.

Fig. 2 and Fig. 3 set forth a system that embodies the characteristics just mentioned, that is, the relay devices for automatically modifying the normal machine operation, under skidding conditions in any machine, are energized in accordance with the currents traversing the respective machine field windings. In my co-pending application, Serial No. 154,864, filed March 14, 1917, patented January 20, 1920, No. 1,328,513, is shown and described a regenerative control system wherein a substantially constant speed of the regenerating machines is maintaned by controlling the system connections in accordnace with the main field-winding current or voltage variations, and the system about to be described constitutes a special case wherein the principle just recited is utilized for a different purpose.

Referring to Fig. 2, the system here shown comprises suitable supply-circuit conductors trolley and ground; a plurality of parallel-related dynamo-electric machines respectively having commutator-type armatures $A^1$ and $A^2$ and field windings $F^1$ and $F^2$ of the series or heavy-coil type; a line switch LS; a plurality of variable resistors $R^1$ and $R^2$; an auxiliary source of energy such as a battery B, for exciting the field windings; a limit switch or current relay 13 for effecting automatic control of the system; and a relay device 130 for modifying the normal machine operation upon the occurrence of a material difference in the machine speeds.

The relay device 130 is provided with a pair of differentially-arranged actuating coils 131 and 132 that are respectively connected in series relation with the main field windings $F^1$ and $F^2$, and suitable auxiliary contact members 133 of the relay device are provided for governing certain auxiliary-circuit connections, as subsequently described in connection with Fig. 3.

Assuming that regenerative operation has been begun in any suitable manner, the main-circuit connections may be traced as follows: from the trolley through conductor 108, line switch LS, junction-point 109, where the circuit divides, one branch including conductor 110, armature $A^1$, junction-point 112 and main-circuit resistor $R^1$ to a second junction-point 113, and the other branch including conductor 114, armature $A^2$, junction-point 116 and main-circuit resistor $R^2$ to the junction-point 113, whence a common circuit is completed through conductors 117 and 118, the actuating coil 31 of the limit switch 13 and conductor 119 to the negative conductor ground.

The field-winding excitation circuit is completed from one terminal of the battery B, or other source of energy, through conductor 117, junction-point 113, main-circuit resistor $R^1$, junction-point 112, main field winding $F^1$, conductor 120 and actuating coil 131 of the relay device 130, to junction-point 121, and another branch includes main-circuit resistor $R^2$, junction-point 116, main field winding $F^2$, conductor 122 and actuating coil 132 of the relay device 130 to the junction-point 121, whence a common circuit is completed through conductor 123 to the opposite terminal of the battery B.

The system just set forth is fully described in my co-pending application, Serial No. 44,443, filed August 9, 1915, patented April 1, 1919, No. 1,298,706, to which reference may be made if it is desired to understand the regenerative operation of the machines in detail. In the present instance, it is of interest to note only that the variation of the main-circuit resistors $R^1$ and $R^2$ serves to increase the field-winding excitation of the momentum-driven machines as the speed thereof decreases, thus automatically and suitably regulating the regenerative operation, since the action of the resistor short-circuiting switches is dependent upon the limit switch 13, as about to be described in detail.

As previously stated, the actuating coils for the relay device 130 may be energized in accordance with the main field-winding voltages, if desired; that is, the actuating coils may be connected directly across the main field windings $F^1$ and $F^2$, respectively.

With reference to Fig. 3, the auxiliary governing system shown comprises a master controller MC, the battery B, the actuating coil of the line switch LS and the auxiliary contact members of the limit switch 13, and, in addition, the auxiliary contact members 133 of the relay device 130, a drum controller 135 for varying the active circuit values of the resistors $R^1$ and $R^2$ and an actuating mechanism 136 for the controller 135.

The controller 135 is provided with a plurality of contact segments 137 and 138 of configurations suitable for successively engaging a plurality of sets of control fingers 139 and 140, respectively, and thus gradually short-circuiting the main-circuit resistors $R^1$ and $R^2$, in accordance with a familiar practice.

The actuating mechanism 136 is of a familiar electrically-controlled, pneumatically-actuated type and comprises a pinion 141 which is suitably secured to the upper end of the controller operating shaft 142 and is adapted to mesh with a horizontally-movable rack member 143, to the opposite ends of which a plurality of pistons 144 and 145 are respectively attached to travel within suitable operating cylinders 146 and 147. A pair of dissimilar valve members 148 and 149 are associated with the respective cylinders 146 and 147 to admit fluid pressure thereto through pipes or passages 150 and 151 from any suitable source (not shown), under conditions to be described.

The valve member 148 is normally closed to prevent the access of fluid pressure to the cylinder 146 and is adapted to admit fluid pressure thereto only when an actuating coil marked "On" is energized. On the other hand, the valve member 149 is normally open to admit fluid pressure to the cylinder 147, and only when its actuating coil marked "Off" is energized, is fluid pressure released from the cylinder to the atmosphere, while communication with the inlet pipe 151 is shut off.

The mechanical operation of the actuating mechanism 136, without regard to the electrical connections effected thereby, may be set forth as follows: By reason of the normal open condition of the valve member 149, it follows that the pistons 144 and 145 and the mechanically-connected drum controller 135 are normally biased to the illustrated positions, wherein the entire main-circuit resistors $R^1$ and $R^2$ are actively included in the main circuits. Upon the simultaneous energization of the actuating coils "on" and "off," the normal unbalanced fluid-pressure conditions in the actuating mechanism 136 are reversed, that is, fluid pressure is admitted to the cylinder 146 and is exhausted from the cylinder 147, whereby the pistons move toward the right from the illustrated position, while the drum controller moves toward the left to cause coöperative engagement of the corresponding contact segments and control fingers and thus gradually short-circuit the resistors $R^1$ and $R^2$.

The movement of the actuating mechanism may be arrested at any point by merely deënergizing the "off" actuating coil, and such action is accomplished in the illustrated system by means of the familiar limit switch 13 whenever the main-circuit current rises above a predetermined value, as subsequently described in detail.

To effect the return movement of the actuating mechanism, both the "off" and the "on" coil are deënergized, and the consequent reversion of fluid-pressure conditions to the initial unbalanced state causes backward movement toward the illustrated position.

Assuming that conditions are proper for regenerative operation, the master controller MC is actuated to its initial operative position $a$, whereupon one circuit is established from the positive terminal of the battery B through conductors 60, control fingers 61 and 62, which are bridged by the contact segment 63, conductor 64, the actuating coil of the line switch LS and conductors 65 and 66 to the negative battery terminal.

A further circuit is established from the positively-energized control finger 62 through connector 156, the actuating coil "on" of the operating mechanism 136, conductor 157, auxiliary contact members 133 of the relay device 130 in its lower position, and conductor 158 to the negative conductor 66.

The momentum-driven machines are thus connected to the supply circuit, with the entire resistors $R^1$ and $R^2$ included in the respective main-armature circuits.

No movement of the controller 135 occurs, however, until the master controller is moved to its second operative position $b$ to complete a circuit from the contact segment 63 thereof through control finger 67, conductor 68, coöperating contact members 32 of the limit switch 13, conductor 159, the actuating coil "off," conductor 160 and thence, through conductor 157, to the negative battery terminal, as already traced.

Since both actuating coils of the operating mechanism 136 are simultaneously energized, movement thereof through its successive positions in a step-by-step manner occurs, such movement being controlled by the action of the limit switch 13, which holds the controller 135 in the corresponding position whenever the main-circuit current rises above a certain value, in accordance with familiar principles.

However, upon the occurrence of the previously-mentioned skidding conditions in either machine, the resultant strengthening of the corresponding main field-winding excitation, by reason of the inherent regulating action hereinbefore set forth and the consequent energization of the relay device 130 by the materially different main field-winding currents, will cause the relay device to rise to its upper position and thus interrupt the previously traced energizing circuits of both the "on" and the "off" actuating coils for the controller 135. Thus, the controller gradually returns toward its "off" position to insert more resistance in the main circuits, and thereby tend to restore normal operating conditions, until the relay device 130 drops to its illustrated position to again energize the actuating coils in question and thus permit forward movement of the controller 135, as governed by the limit switch 13.

It will be understood that, if desired, instead of utilizing a common controller 135 for both main-circuit resistors $R^1$ and $R^2$, separate controllers may be used, and, upon skidding conditions in either machine, only the corresponding main-circuit controller may be halted or moved backwardly. Such results could be accomplished, for example, by employing low-current relay devices in the armature circuits of the respective machines, the auxiliary control system being arranged somewhat similarly to that set forth in Fig. 3 in that, upon a decrease of current in either main machine by reason of skidding conditions, the drop of the corresponding relay device to a lower position would, for instance, deënergize both the "on" and the "off" actuating coils of the allied controller.

Another means of accomplishing the result just mentioned comprises differentially-related relay devices of the motor type that are energized in accordance with the circuit conditions of the respective machines, as set forth in my co-pending application, Serial No. 70,437, filed January 15, 1916.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of dynamo-electric machines, of means for normally and progressively effecting operation of said machines in steps, and means dependent upon a material difference in the machine speeds for automatically reversing the order of a plurality of said steps.

2. In a system of control, the combination with a plurality of dynamo-electric machines, of means for normally and automatically operating said machine in steps in accordance with current conditions, and means dependent upon a material difference in the machine speeds for automatically reversing the steps of said operation only until normal speed conditions again obtain.

3. In a system of regenerative control, the combination with a plurality of momentum-driven dynamo-electric machines, of means for normally and automatically retarding said machines in accordance with current conditions, and means dependent upon a material difference in the machine speeds for automatically reversing the retarding operation until normal speed conditions again obtain.

4. In a system of control, the combination with a plurality of dynamo-electric machines severally having armatures and field windings, of an auxiliary source of energy for exciting said field windings, means for varying such excitation under predetermined conditions, and means dependent upon material differences of machine speeds for reversing such variation.

5. In a system of control, the combination with a plurality of dynamo-electric machines severally having armatures and field windings, of a plurality of resistors in series-circuit relation with the respective armatures, a controller for gradually short-circuiting said resistors, a limit switch for governing the operation of said controller, and relay means dependent upon a material difference of machine speeds for reversing the operation of said controller.

6. In a system of control, the combination with a plurality of dynamo-electric machines severally having armatures and field windings, of a plurality of resistors in series-circuit relation with the respective armatures, an auxiliary source of energy for exciting said field windings through the respective resistors, a controller for gradually short-circuiting said resistor, a limit switch for governing the operation of said controller, and relay means dependent upon a material difference in the currents traversing corresponding portions of the respective machines for reversing the operation of said controller.

7. In a system of control, the combination with two or more parallel-related direct-current machines, of means dependent upon a material difference in the machine speeds for automatically and retrogressively continuing the normal machine operation until normal speed conditions again obtain.

8. In a system of control, the combination with a plurality of dynamo-electric machines severally having armatures and field windings, of means for varying the excitation of said field windings in a certain direction during normal machine operation, and means responsive to material differences of machine speeds for reversing such variation until normal conditions are restored.

In testimony whereof I have hereunto subscribed my name this 20th day of Oct., 1919.

RUDOLF E. HELLMUND.